July 13, 1926.

J. A. HORNE

PROPELLER

Filed July 27, 1925    2 Sheets-Sheet 1

1,591,977

Inventor

J. A. Horne.

By Lacey & Lacey, Attorneys

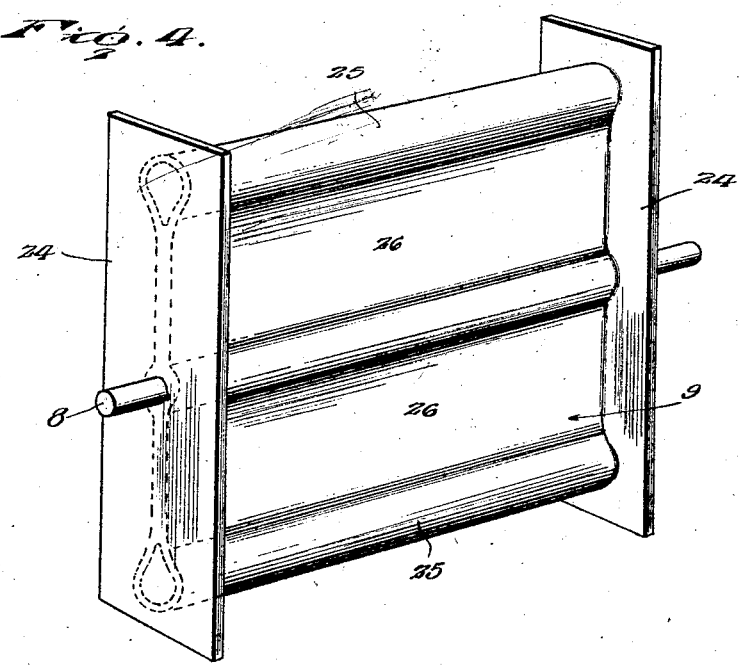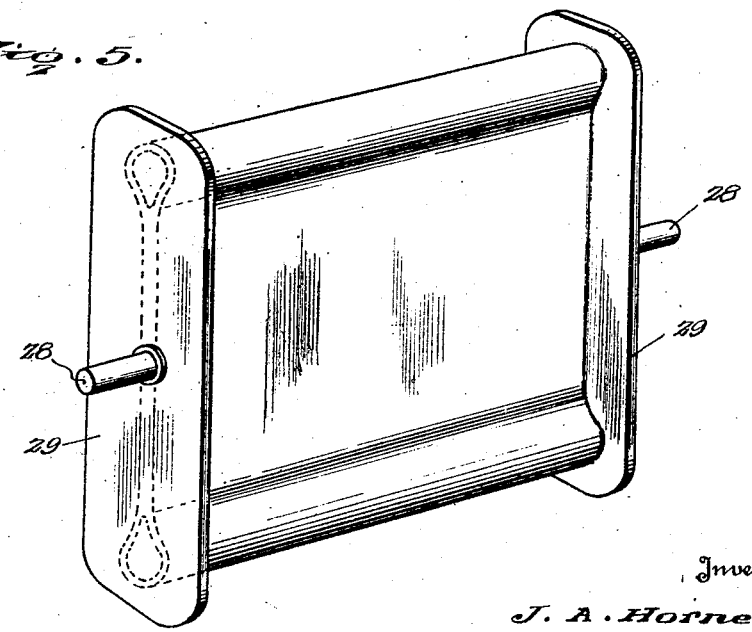

Patented July 13, 1926.

1,591,977

UNITED STATES PATENT OFFICE.

JAMES A. HORNE, OF ESTES PARK, COLORADO.

PROPELLER.

Application filed July 27, 1925. Serial No. 46,398.

This invention relates to propellers for use in driving and controlling vessels intended for travel through the air or upon the water and has for its object the provision of novel means whereby the propelling blades will be given a feathering action so that they will present maximum resistance to the medium in which the vessel is traveling at one point in their operation and at other points will present minimum resistance. The invention also has for its object the provision of a novel form of propeller blade whereby maximum efficiency is attained without undue weight.

In the accompanying drawing:

Fig. 4 is a perspective view of one form of blade;

Fig. 5 is a similar view showing a somewhat different form of blade.

Figure 1:
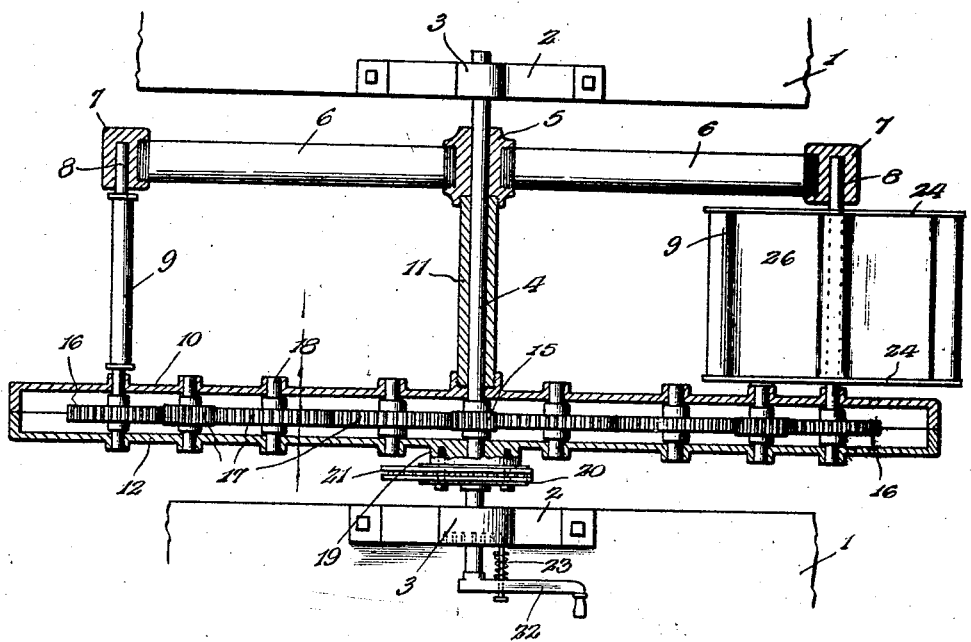
Figure 1 is a view, partly in plan and partly in horizontal section, of a propeller embodying my present improvements.
Figure 2:
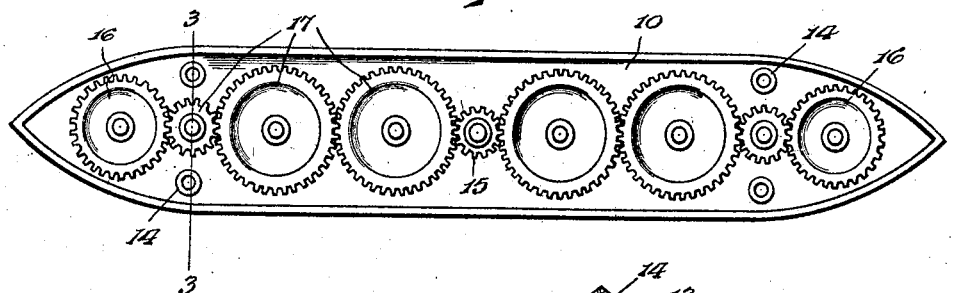
Fig. 2 is a side elevation of the same.
Figure 3:
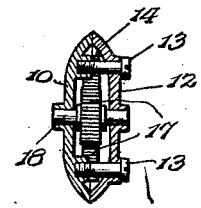
Fig. 3 is a detail section on the line 3—3 of Fig. 2.

In the drawings, the reference numeral 1 indicates portions of a vessel which may be an aeroplane, a boat or other vehicle. Upon the frame are supports 2 having bearings 3 thereon in which bearings is journaled a controlling rod 4, as shown. Near one end of this controlling rod 4, a casting or coupling 5 is loosely mounted thereon, and in the opposite sides of this coupling or casting are fitted the ends of frame bars 6 which have their outer ends secured in other couplings 7. The couplings 7 each provide a bearing for one end of a propeller shaft or trunnion 8 which is rotatably mounted therein and carries a propeller blade 9. The front end of each propeller shaft 8 is journaled in a frame member 10 which is loosely supported upon the main controlling rod or shaft 4, and between the said frame member and the coupling 5 a spacing sleeve 11 is fitted loosely about the controlling rod and has its ends secured in the said frame member 10 and coupling 5, as shown in Fig. 1. The frame member 10 may be a bar corresponding to the bar 6, but it is illustrated in the present embodiment of the invention as a plate transversely dished and having its ends tapered. This frame member 10 mates with a similar plate or frame member 12 which is secured thereto by cap screws or bolts 13 inserted through one member and engaged in bosses 14 upon the other member, the two frame members when thus secured together constituting a shell, as shown most clearly in Fig. 3, to house the gears whereby the feathering of the blades is effected. The gears referred to include a pinion 15 fixed upon the controlling rod 4, spur wheels 16 fixed upon the ends of the propeller shafts 8 and intermediate meshing gears 17. All the gears are housed by and between the members 10 and 12 and the intermediate gears 17 may be mounted upon shafts 18 fitted through and secured in suitable openings provided therefor in the members 10 and 12 or upon studs formed integral with one of said frame members and engaging sockets in the other frame member. It is immaterial how many intermediate gears are employed or what their relative diameters may be but it is important that the end gears 16 be twice as large as the center pinion 15. Upon the outer frame member 12 at the center thereof is formed a boss or hub 19 which is loosely engaged upon the controlling rod 4 and secured to this boss is a sprocket 20 about which is trained a sprocket chain 21 extending to any convenient source of power. When power is imparted to the sprocket 20 through the chain 21, the frame consisting of the members 10, 12 and the frame bars 6 will be caused to rotate about and upon the controlling rod 4 in an obvious manner so that the propeller blades 9 will be caused to engage the air or the water and effect propulsion of the vessel. As the sustaining frame rotates about the rod 4, the innermost gears 17 will, of course, be caused to roll upon the center pinion 15 and the motion thus generated will be transmitted to the spur wheels 16 so that the propeller shafts 8 will rotate about their own axes and the blades 9 will, consequently, be caused to present their edges to the medium in which the vessel is traveling during a part of their travel and during another part of their travel will present a face to said medium so as to effect propulsion of the vessel in the required direction.

It will be readily understood that by rotating the controlling rod 4 the point at which the blades will feather may be controlled and to effect such rotation the controlling rod is provided at one end with a crank or other handle 22 carrying a latch 23 adapted to engage in one of a series of sockets provided in the adjacent bearing 3 and thereby lock the controlling rod in a set position.

The propeller blades 9 are keyed or otherwise secured to the respective propeller shafts and each blade has side portions or flanges 24 which are straight and an end portion 25 which is convex and extends between the flanges 24, as shown in Fig. 4. The faces of the blade are dished, as shown at 26, so that they present concave surfaces to the air or water, and these concave surfaces together with the relatively thickened edge portions 25 and the straight side flanges 24 form pockets whereby the blade will obtain a strong hold or purchase in the water or the air so that they will exert the maximum propelling force. The blades of this form will readily penetrate the air or the water when presented edgewise thereto and will present the maximum working surface when presented flatwise thereto, and it is to be noted that the opposite faces of the blades are of the same form so that the blade will operate with the same efficiency when moving in either direction and it is, therefore, immaterial whether the vessel is being propelled in one direction or in the opposite direction. It will also be understood that by manipulating the handle 22, the frame of the propeller may be set so that the blade will present its face in the direction of its movement either horizontally or vertically as may be desired so that the propeller may be used entirely for ascent or controlling descent or may be used to propel the vessel in either a forward or a backward direction. The train of gears whereby the feathering of the blades is effected may be carried upon the side of frame bars corresponding to the bars 6 but by enclosing them in a shell or housing they are protected against accumulations of dirt and other foreign matter and against damage from chance blows and are also capable of running in oil so that thorough lubrication may be effected and the highest efficiency of operation attained.

In Fig. 4, the blade is shown as mounted upon a shaft 8 extending through the blade, the material of the blade encircling the shaft, while in Fig. 5 the blade is carried by trunnions 28 projecting from the flanges 29, the central ridge encircling the shaft being eliminated. Fig. 4 shows flanges with square corners while Fig. 5 shows flanges with rounded ends, but in both forms the flanges project beyond the faces of the blade and define therewith a complete concave bottomed pocket offering great resistance to air or water.

The device is not only a propeller for navigating vessels but may be advantageously employed in windmills, ventilators, and other places.

Having thus described the invention, I claim:

A propeller comprising a frame mounted for rotation upon a central transverse axis, propeller blades rotatably mounted in the ends of the frame, one side of the frame being a hollow shell, and a train of gears housed in said shell and including a central pinion fixed at the axis of rotation of the frame, spur gears fixed upon the propeller shafts, means for rotating the frame, and means for setting the train of gears whereby to effect feathering of the blades at any desired point in the rotation of the frame.

In testimony whereof I affix my signature.

JAMES A. HORNE. [L. s.]